United States Patent [19]

Leigh

[11] 4,074,340

[45] Feb. 14, 1978

[54] TRIMMABLE MONOLITHIC CAPACITORS

[75] Inventor: William Conrad Leigh, Monroe, Conn.

[73] Assignee: Vitramon, Incorporated, Monroe, Conn.

[21] Appl. No.: 733,089

[22] Filed: Oct. 18, 1976

[51] Int. Cl.$^2$ ............................................. H01G 4/34
[52] U.S. Cl. .................................. 361/321; 361/272; 361/330
[58] Field of Search ....................... 361/272, 321, 330

[56] References Cited

U.S. PATENT DOCUMENTS

| | | | |
|---|---|---|---|
| 3,586,933 | 6/1971 | Bonini | 361/321 |
| 3,612,963 | 10/1971 | Piper | 361/321 |
| 3,694,710 | 9/1972 | Kirschner | 361/321 |
| 3,898,541 | 8/1975 | Weller | 361/321 |

FOREIGN PATENT DOCUMENTS 1,579,187   8/1969   France ................................ 361/330

Primary Examiner—E. A. Goldberg
Attorney, Agent, or Firm—Arnold Grant

[57] ABSTRACT

Incrementally adjustable multilayer monolithic capacitors having a set of base electrodes extending to and being coextensive with a first terminal end surface of the capacitor and a set of incremental electrodes extending to and being coextensive with a side surface of the capacitor. The base electrodes are electrically interconnected by a conductive metal coating on the first terminal end surface. Capacitance values of the resultant capacitor can be incrementally adjusted by electrically interconnecting or disconnecting one or more of the incremental electrodes either along the side surface to which they extend and are coextensive with or along the second terminal end surface of the capacitor.

15 Claims, 7 Drawing Figures

TRIMMABLE MONOLITHIC CAPACITORS

BACKGROUND OF THE INVENTION

Multilayer monolithic ceramic capacitors, often referred to as chip capacitors, usually consist of alternate layers of electrically non-conductive ceramic dielectric material which separate alternately polarizable refractory, electrically conductive metal electrodes. The structure is generated in a "green" state and fired. The ceramic provides not only the dielectric layers but also the mechanical matrix for the electrodes and the encasement system which affords the unit its physical geometry and environmental protection.

Layers of electrode material commonly extend to opposite ends of the capacitor and are interconnected at the ends by a metal coating composition, usually a noble metal such as silver combined with a glass, which is also fired, and thereby bonded to the ends of the capacitor. The metal coating composition on the ends not only connects each electrode layer of like polarity but also provides a solderable media. Solder is commonly used to attach leads to the capacitor or to directly connect the capacitor to a circuit substrate.

The performance of the capacitor is established by the dielectric within the electric field region. Since it is the electric field or active region which accepts the charge, withstands the high potential gradient, and stores the electrical energy, it follows that it is the region in which capacitance failure or degradation is most likely to occur.

These ceramic capacitors are, for the most part, readily manufactured within acceptable capacitance tolerances although it is not atypical for a particular batch to have capacitance values which vary over a wide range of values. In applications where close accuracy in capacitance values is required, e.g., tolerances of plus or minus 1 percent from the rated value, or where in situ adjustment of capacitance value is desired, typical procedure is to individually test and select capacitors having a capacitance value greater than the desired value and to trim these capacitors down to the desired value by removing portions of the electric field region either by cutting and/or by sand-blasting into the structure. Several systems for selectively removing electrode material while monitoring the capacitance value of the capacitor are known in the prior art. Examples of these are U.S. Pat. Nos. 2,603,737 and 2,712,172. Other examples of the state of the art are U.S. Pat. No. 3,235,939 which shows multilayer capacitors calibrated by grinding away a portion of the electric field region from a side edge of the capacitor; U.S. Pat. No. 3,456,170 which shows electrode material being dished out from one of the plane surfaces of the capacitor and an insulating glaze placed over the exposed electric field region; and, British Patent 1,180,928 which teaches the capacitor being made so as to have a plurality of electrode areas of discrete size which are successively cut out as the capacitance is monitored. A still more recent development includes U.S. Pat. No. 3,648,132 which discloses layers of electrode material embedded entirely within the capacitor so that their margin portions are positioned short of the edge. By removing some of the dielectric material which separates the concealed electrode margins from the edge, the concealed electrodes can be exposed and then electrically connected to the electrodes terminating at that end.

In each of the aforementioned prior art systems either the electric field region or the immediately adjacent dielectric region is abraded or otherwise disturbed. In some of the prior art processes, the outer dimensions of the capacitor are changed during adjustment by varying amounts which results in a nonuniform product. More importantly though, by exposing the nascent electric field region to foreign environmental elements, the dielectric strength and other essential properties of the capacitor are seriously impaired. To offset these objections somewhat, U.S. Pat. Nos. 3,456,170 and 3,394,386 have suggested placing a ceramic material over the exposed region and firing it. However, the possibility for damage arises when the critical electric field region is first exposed. In addition to possible deleterious effects, each of these prior art systems involve considerable processing labor and equipment which makes it quite expensive to perform an adjustment in capacitance value. Since certain of the adjustment devices require that electrical contact be made so as to monitor capacitance value during the grinding process it is evident that the instrumentation must be quite sturdy to withstand the constant vibration and abrasive atmosphere.

A variation in the art of incrementally adjusting monolithic capacitors which permits adjustment without the above problems and without invading the structure of the capacitor is U.S. Pat. No. 3,586,933. This patent teaches adjustment by means of serially connecting or disconnecting sets of fine trimming electrodes which extend to a side surface of the capacitor. The drawback of this otherwise noteworthy invention is that connection of the fine trimming electrodes is accomplished by dipping the entire capacitor into a bath of liquid conductive coating material. Thus, while the capacitor can be adjusted by the manufacturer to bring it within design tolerances, it can not be adjusted in situ by the user.

An advance in the art which overcomes both the aforementioned problems and permits in situ adjustment was made with U.S. Pat. No. 3,898,541 which teaches a capacitor having a set of incremental adjusting electrodes extending to a side surface and a connecting electrode which extends to both a side surface and an end terminal. Adjustments according to this invention are made by electrically interconnecting one or more of the adjusting electrodes with the connecting electrode. However, capacitors made in accordance with the teachings of this invention have the practical disadvantage of limiting the minimum capacitance available relative to the base capacitance value before any adjustments are made. This is due to the capacitance effect between the connections, electrode(s) buried inside the capacitor body and any opposing polarity electrodes present inside and outside the capacitor body. Those skilled in the art will readily appreciate the magnitude of this disadvantage since in many applications it is unacceptable for the adjustment electrodes to add to the rated value of the capacitor.

Other patents on the general subject of adjustable capacitors are U.S. Pat. Nos. 2,919,483, 3,223,905, 3,237,006, 3,448,355, 3,883,937, 3,821,617, 3,818,287, 3,400,312, 3,444,436, 2,395,442, 3,496,434, 3,398,541, 3,539,949, 3,714,530, 3,593,115, 3,737,805, 2,736,080, 3,379,943, 3,398,326, 3,448,355, 2,875,387, 3,651,548, 3,896,354, 3,586,933, 3,237,006, 3,883,937 and 3,391,312.

SUMMARY OF THE PRESENT INVENTION

The present invention is directed to overcoming all of the above described problems by providing a multilayer monolithic ceramic capacitor which (1) can be adjusted both by the manufacturer and in situ; (2) can be adjusted without invading the structural integrity of the capacitor body; and, (3) provides incremental adjustment electrodes which do not appreciably add to the rated value of the capacitor. More particularly, the present invention solves these problems by providing a monolithic multilayer ceramic capacitor having a set of base electrodes which extend to and are coextensive with a first end terminal surface of the monolithic capacitor body. As will be more fully explained hereinafter, a monolithic capacitor according to the present invention is defined as a six-sided monolith consisting of two end terminals, two major surfaces, i.e., a top and a bottom both of which are in planes substantially parallel to the planes of the electrodes of the capacitor, and two side surfaces, both of which are in planes substantially perpendicular to the electrodes of the capacitor. Each of the base electrodes is electrically interconnected to the other base electrodes by a conductive metal coating which is also coextensive with the first end terminal surface of the capacitor body.

Capacitors according to the present invention additionally contain at least one and preferably several incremental adjusting electrodes each of which extends to and is coextensive with a side surface of the monolithic capacitor body. As will also be more fully explained hereinafter a base electrode covers at least a majority of the available surface area of the plane it occupies in the multilayer capacitor body. An incremental adjusting electrode, on the other hand, occupies less than a majority of the available surface area of the plane it occupies in the multilayer capacitor body; although several physically discrete incremental adjusting electrodes can occupy the same plane of the multilayer capacitor body and in so doing can, in total, occupy a majority of the surface area of that particular plane. Capacitance value is adjusted by completing or severing electrical interconnections between the incremental adjusting electrodes. When adjustment of the capacitance value is required the incremental adjustment electrodes are electrically interconnected to external circuitry by a path of conductive coating material through either a common conductive orientation pad on an exterior surface of the capacitor or through a conductive orientation strip on the exterior surface receiving substrate. Accordingly, providing or disrupting paths of conductive coating material on the readily accessible exterior surfaces of the capacitor or the receiving substrate results in upward or downward adjustment of the capacitance value of the capacitor; all of which can be accomplished in situ by both the manufacturer and user without the deleterious affect of invading the structural integrity of the capacitor body.

BRIEF DESCRIPTION OF THE INVENTION

DETAILED DESCRIPTION OF THE INVENTION

Figure 1:
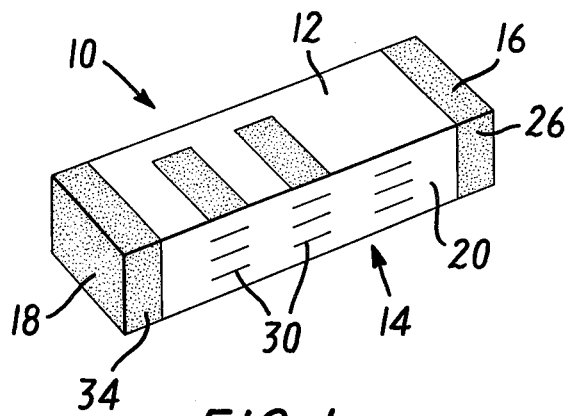
FIG. 1 is a perspective view of a first embodiment of an incrementally adjustable monolithic capacitor according to the present invention.
Figure 2:
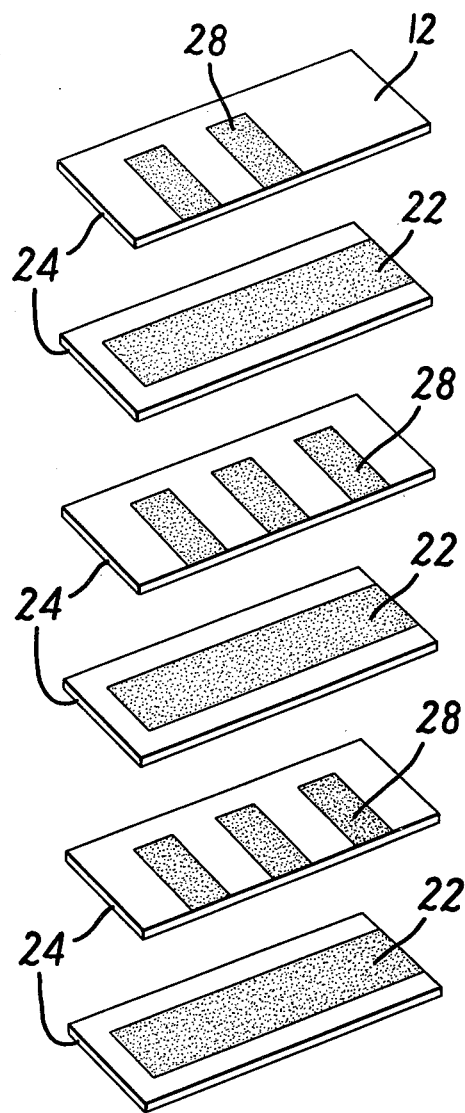
FIG. 2 is an exploded view of the capacitor plate containing layers of the incrementally adjustable monolithic ceramic capacitor shown in FIG. 1.
Figure 3:
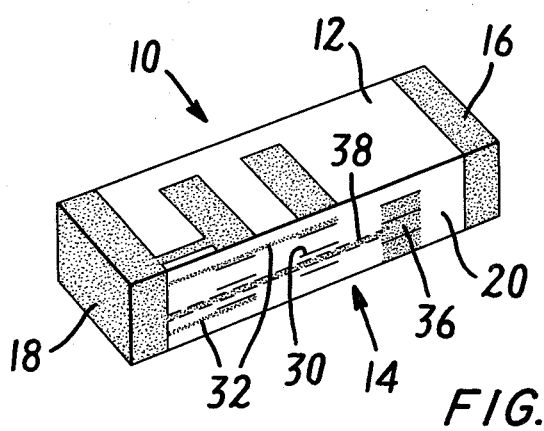
FIG. 3 is a perspective view of the monolithic ceramic capacitor of FIG. 1 showing several of the incremental adjusting electrodes electrically interconnected to a conductive orientation pad.
Figure 4:
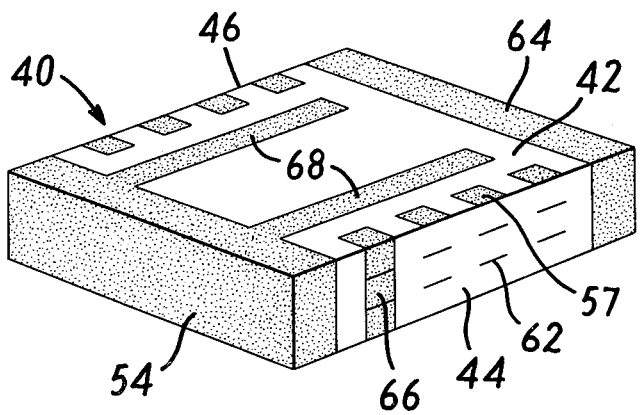
FIG. 4 is a perspective view of a second embodiment of an incrementally adjustable monolithic capacitor according to the present invention showing one method of electrically interconnecting the incremental adjusting electrodes.
Figure 5:
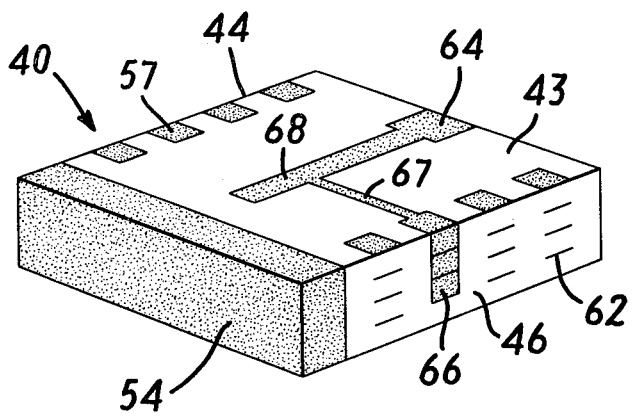
FIG. 5 is also a perspective view of a second embodiment of an incrementally adjustable monolithic capacitor according to the present invention showing another method of electrically interconnecting the incremental adjusting electrodes.

Referring now to FIGS. 1, 2 and 3 an incrementally adjustable monolithic ceramic capacitor 10 depicts a first embodiment of the present invention. The capacitor 10 comprises two major surfaces, a top 12 and a bottom 14 and four minor surfaces, a first terminal end 16, a second terminal end 18, a first side 20 and a second side (not visible). Multilayer monolithic ceramic capacitors of this type are generally made by stacking together alternate layers of ceramic dielectric material, and electrode material, each electrode layer being isolated from the other electrode layers within the structure of the capacitor body by the alternate layers of dielectric material. Examples of suitable ceramic material which are usually heavy metal titanates include barium titanate and magnesium titanate; examples of suitable electrode material which are usually in the form of a refractory metal paste of a noble metal or mixture of noble metals which can withstand the very high firing temperatures required for the ceramic (typically 1090° C to 1400° C) include platinum, palladium, gold and alloys thereof. The structure is laminated in a "green" state and fired in a furnace which results in a dense cohesive body structure.

As can be seen more particularly in FIG. 2, this embodiment of the present invention has a set of base electrodes 22, positioned, such as by screen printing, onto layers of dielectric material 24, each of which base electrodes extend to and are coextensive with only the first end terminal 16. As used herein, for purposes of describing the present invention, a base electrode is defined as an electrode which occupies at least a majority of the available surface area of the plane it occupies in the multilayer capacitor body. The individual base electrodes are electrically interconnected to thereby form a capacitor by means of a conductive metal frit mixture 26, such as silver-glass or palladium-glass or other noble metal-glass which is bonded to the first terminal end 16 by firing.

The capacitor formed by the electrical interconnection of the base electrodes 22 can be incrementally adjusted by means of at least one set of increment electrodes 28 printed onto layers of dielectric material 24. Several incremental electrodes are shown in FIG. 2 because this permits the greatest variation in the capacitance value of the resultant capacitor and is, accordingly, a preferred embodiment of the present invention.

Figure 7:
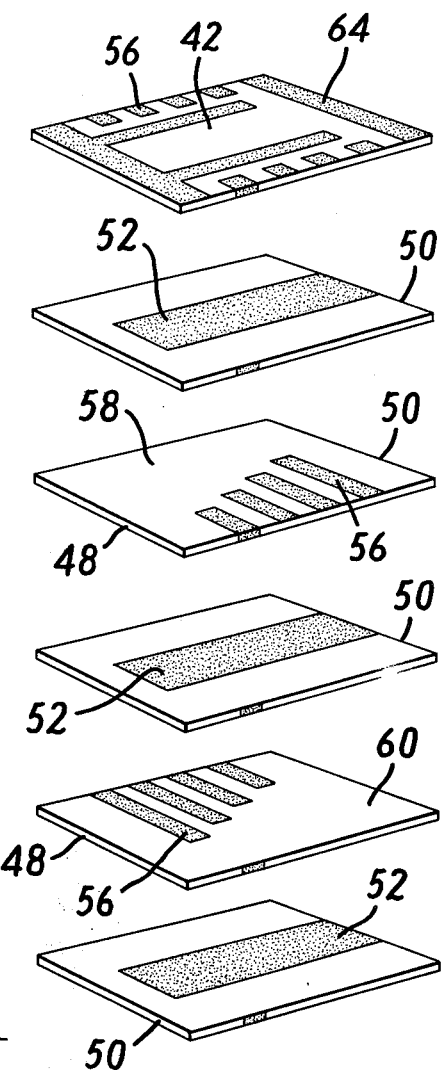

However, it should be understood that only one incremental electrode is also within the scope of the present invention and that if more than one incremental electrode is present they may be of the same or different capacitance values. An example of incremental electrodes of different capacitance values is shown in FIG. 7. The incremental electrodes 28 extend to and are coextensive with a side surface of the monolithic capacitor 10. The coextensive feature of the incremental electrodes along a side surface is exemplified as element 30. In the embodiment of FIGS. 1 to 3 the incremental electrodes extend to and are coextensive with side 20. It is, however, within the scope of the present invention for one or more of the incremental electrodes to extend to and be coextensive with one side surface and other incremental electrodes to extend to and be coextensive with the other side surface. It is also within the scope of the present invention for the incremental electrodes to extend to and be coextensive with both side surfaces of the monolithic capacitor; this for ease of in situ adjustment by the ultimate user of the present invention. Finally, as is shown in each of FIGS. 1 to 3, incremental electrode 28 can be printed onto either of the major surfaces of the capacitor to maximize the range of possible incremental adjustments.

Incremental upward adjustment of the capacitor 10 from the base capacitance value may be made by means of creating principal conductive paths 32 which can be, for example, a relatively thin wire soldered or otherwise bonded to the side of the capacitor or a discrete strip of metal-frit mixture fired to the side surface of the capacitor. The principal conductive paths 32 extend to and are electrically connected to a conductive coating 34 on second end terminal 18 which conductive coating is similar to the metal-frit mixture 26 on first end terminal 16. It is, however, within the scope of the present invention to have each of the incremental electrodes in a set electrically interconnected by a secondary conductive path 36 positioned on a side surface of the capacitor and from there either to external circuitry in the same manner as first end terminal 16 is electrically interconnected to external circuitry when the capacitor 10 is placed in position for use or by means of a further conductive path 38 to conductive coating 34. Once upwardly adjusted, the capacitor according to the present invention can be downwardly adjusted to return it to its base capacitance value by severing the conductive paths 32. Since the conductive paths 32 are on external surfaces of the capacitor the capacitance value can be readily adjusted in situ by the user as well as the manufacturer without in any way invading the structural integrity of the monolithic body.

Looking now to FIGS. 4 to 7 a second embodiment of the incrementally adjustable monolithic capacitor 40 of the present invention is shown. The capacitor 40 comprises two major surfaces, a top 42 and a bottom 43, and four minor surfaces, a first side surface 44, a second side surface 46, a first terminal end 48, and a second terminal end 50. The base electrodes 52 (FIG. 7) of this embodiment of the invention are similarly positioned onto layers of dielectric material and also extend to and are coextensive with only the first end terminal 48. The individual base electrodes are electrically interconnected, to thereby form a capacitor, by means of a conductive metal frit mixture 54, such as silver-glass or other noble metal-glass which is bonded to the first terminal end 48 by firing.

The capacitor of the second embodiment of the present invention also contains incremental electrodes 56 which permit incremental adjustment of the capacitor formed by the electrical interconnection of base electrodes 52. Several incremental electrodes are shown in FIG. 7 because this permits the greatest variation in the capacitance value of the resultant capacitor and is, accordingly, a preferred embodiment of the present invention. However, it should be understood that, as with the first embodiment described above, only one incremental electrode is also within the scope of the present invention. Thus, if more than one incremental electrode is present they may be of different capacitive values, as illustrated in FIG. 7 or the same capacitive values as illustrated in FIG. 2.

The incremental electrodes extend to and are coextensive with at least one side surface of the capacitor. In the view depicted by FIGS. 5 and 7 the incremental electrodes positioned on dielectric material layer 58 extend to and are coextensive with first side surface 44; whereas the incremental electrodes positioned on dielectric material layer 60 extend to and are coextensive with second side surface 46. It is also within the scope of the present invention to have the incremental electrodes extend to and be coextensive with both side surfaces of the capacitor 40 for ease of in situ adjustment by the ultimate user. The coextensive feature of the incremental electrodes along a side surface is exemplified by element 62.

As is shown in each of FIGS. 4 to 7 either or both or the major surfaces 42, 43 of the monolithic capacitor have pickup pads 57, which may be large enough to also function as incremental electrodes. The capacitor may also contain a conductive coating 64 on the second end terminal 50 of the capacitor. The conductive coating 64 is preferably comprised of either a metal-frit mixture fired onto the capacitor or a noble metal or noble metal mixture similar to the incremental electrodes.

Incremental upward adjustment of the capacitor 40 from the base capacitance value can be by any of several means. A first preferred means is the placement of conductive path 66, electrically interconnecting as many of the incremental electrodes as desired along the points 62 where the incremental electrodes are coextensive with a side surface, with the pick-up pad 57 on the top or bottom surface of the capacitor. In this preferred means one (FIG. 4) or more (FIG. 5) electrically conductive junctions 68 extend from conductive coating 64 on the second end terminal 50 along the major surface of the capacitor. Electrical interconnection is completed by conductive stripe 67 being continued from pick-up pads 57 and then to the conductive junction 68 and conductive coating 64.

Figure 6:
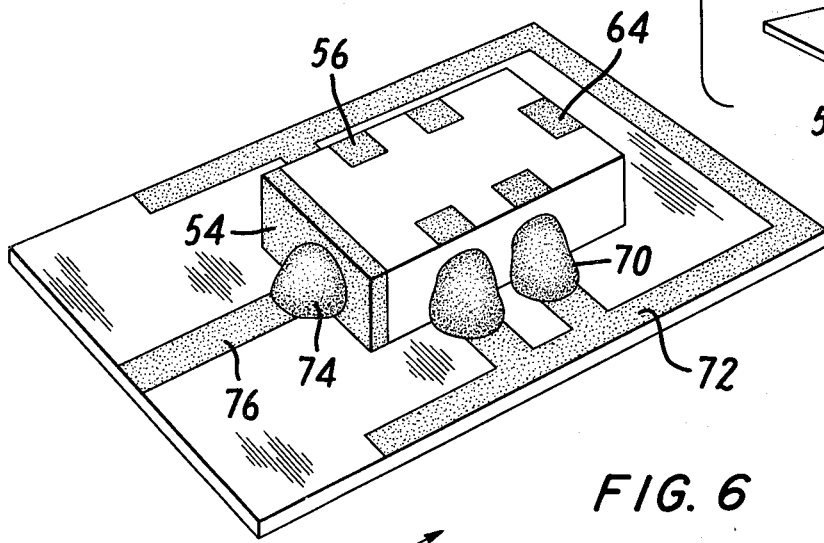
FIG. 6 is a perspective view of the second embodiment of the present invention showing a further method of electrically interconnecting the incremental adjusting electrodes; and, FIG. 7 is an exploded view of the capacitor plate containing layers of the incrementally adjustable monolithic ceramic capacitor shown in FIGS. 4 through 6.

FIG. 6 shows a second preferred means for incremental adjustment of the capacitor 40. In this preferred means conductive paths 70 directly electrically interconnect the incremental electrodes from the point 62 where they are coextensive with a side surface of the capacitor, to a conductive orientation strip 72 on an intermediate substrate or the final substrate. As can be seen in this preferred means a conductive path 74 electrically interconnects the base electrodes through the first end terminal conductive coating 54 to a conductive orientation strip 76 on the intermediate or final substrate.

In a particularly preferred embodiment which provides very low capacitance values the pick-up pads 57, the conductive pick-up pad 64 and the conductive junctions 68 are each outside of the electric field region of the capacitor as it is defined by the dimensions of the base electrodes. In this manner these conductive elements do not add to or otherwise affect, the capacitance value of the capacitor.

In the practice of the invention either the capacitor manufacturer or the ultimate user can connect and disconnect conductive islands an conditions warrant to incrementally adjust the capacitance value of the capacitor As can be readily appreciated both the procedure of incrementally increasing and decreasing capacitance value either by adding or severing a conductive island along the external surface of the capacitor body does not in any way disturb the integrity of the capacitor. Thus, the present invention eliminates the problems of contamination and dissipation and the concomitant capacitor failure prevelant with prior art methods.

As this invention may be embodied in several form without departing from the spirit or essential character thereof the present embodiments are illustrative and not restrictive. The scope of the invention is defined by the appended claims rather than by the decription preceding them, and all embodiments which fall within the meaning and range of equivalency of the claims are, therefore, intended to be embraced by those claims.

What is claimed is:

1. A multilayer monolithic ceramic capacitor comprising a dielectric material body having two major surfaces, a first side surface, a second side surface, a first end terminal and a second end terminal; at least two base electrodes each of which is in a plane substantially parallel to the major surfaces and each of which extends to and is coextensive with only the first end terminal there being no base electrodes extending to and in direct contact with the second end terminal; a conductive coating on the first end terminal which electrically interconnects each of the base electrodes extending to and coextensive with the first end terminal; and, at least one incremental electrode which extends, in a plane substantially parallel to the major surfaces, to, and is coextensive with, at least one side surface of the capacitor.

2. A capacitor as defined in claim 1 comprising at least two incremental electrodes and a conductuve path positioned along the side surface of the capacitor to which the incremental electrodes extend to and are coextensive with, the conductive path electrically interconnecting the incremental electrodes.

3. A capacitor as defined in claim 2 further comprising an electrically conductive coating on the second end terminal of the capacitor and wherein the conductive path electrically interconnecting the incremental electrodes extends to and is electrically joined to the conductive coating on the second end terminal of the capacitor.

4. A capacitor as defined in claim 2 wherein the incremental electrodes occupy at least two spaced apart layers of the capacitor.

5. A capacitor as defined in claim 2 wherein there are at least two spaced apart incremental electrodes on the same plane of the capacitor.

6. A capacitor as defined in claim 1 further comprising at least one pick-up pad positioned on a major surface of the capacitor.

7. A capacitor as defined in claim 2 wherein the incremental electrodes are of different sizes.

8. A capacitor as defined in claim 2 further comprising at least one incremental electrode positioned on a major surface of the capacitor.

9. A capacitor as defined in claim 6 wherein the incremental electrodes are electrically interconnected to the pick-up pad on the major surface.

10. A capacitor as defined in claim 9 further comprising an electrically conductive path on a major surface of the capacitor and a conductive coating on the second end terminal of the capacitor and wherein the conductive path on the major surface extends to and is electrically joined to the conductive path on the second end terminal of the capacitor.

11. A capacitor as defined in claim 1 wherein the capacitor has at least two incremental electrodes, at least one of the incremental electrodes extending to and being coextensive with the first side surface of the capacitor and at least one of the incremental electrodes extending to and being coextensive with the second side surface of the capacitor.

12. A capacitor as defined in claim 11 further comprising a first and a second conductive path positioned on the major surface of the capacitor, the first conductive path extending to and being electrically connected to the incremental electrodes on the major surface extending to and being coextensive with the first side surface of the capacitor and the second conductive path being electrically connected to the incremental electrodes on the major surface extending to and being coextensive with the second side surface of the capacitor.

13. A capacitor as defined in claim 12 wherein the conductive paths are outside of the electric field region of the capacitor as the electric field is defined by the dimensions of the base electrodes.

14. A capacitor as defined in claim 1 wherein at least one incremental electrode extends to and is coextensive with both the first and the second side surfaces of the capacitor.

15. A capacitor as defined in claim 6 wherein said at least one pick-up pad is positioned outside of the electric field region of the capacitor as the electric field is defined by the dimensions of the base electrodes.

* * * * *